United States Patent Office 3,809,709
Patented May 7, 1974

3,809,709
INTERESTERIFICATION OF GLYCERIDES IN THE PRESENCE OF AN ALIPHATIC KETONE
Johannes Jacobus Muller, Rotterdam, and Theodorus Johannes Kock, Heenvliet, Netherlands, assignors to Lever Brothers Company, New York, N.Y.
No Drawing. Filed Dec. 2, 1971, Ser. No. 204,302
Claims priority, application Great Britain, Dec. 4, 1970, 57,648/70
Int. Cl. C11c 3/10
U.S. Cl. 260—410.7
9 Claims

ABSTRACT OF THE DISCLOSURE

Random and direct interesterification processes of glycerides can be accelerated by effecting such processes at temperatures from −30° to 150° C. in the presence of both an alkali metal or its catalytically active derivative and an aliphatic ketone containing 3 to 32 carbon atoms.

BACKGROUND OF THE INVENTION

Field of the invention

The present invention relates to a process for effecting catalytic interesterification of glycerides, especially triglycerides. In catalytic interesterification the fatty acid radicals present in the glycerides, which fatty acids generally differ both in number of carbon atoms and in degree of unsaturation, are rearranged and consequently the melting point, the dilatometric characteristics and other properties of the mixture of glycerides formed differ from those properties of the starting glyceride mixture.

By interesterification is meant the interchange of the fatty acid radicals of the glycerides on the glyceryl radicals in random fashion. This interchange continues dynamically when the oil is in liquid state under the influence of a catalyst until the mixture of molecular configurations reaches an equilibrium in accordance with the laws of probability. The term "molecular configuration" refers to the identity of the fatty acid radicals combined with the glyceryl radical.

Interesterification reactions can be carried out under temperature conditions at which the entire mixture of glycerides is liquid (random interesterification) or partly crystallized (directed interesterification). In the latter type of interesterification reaction the equilibrium in the liquid reaction medium will be disturbed when solid glycerides crystallize out until a new equilibrium under the existing temperature conditions has been reached in said liquid medium.

The invention is especially of advantage for directed interesterification, which reaction, like the random interesterification, is effected in the presence of so-called low temperature catalysts, however, at a temperature at which the higher melting glyceride molecules which are present in the starting glyceride mixtures or which are formed during the reaction crystallize out.

By accelerating the reaction rate of interesterification processes more interesterified oils can be produced per unit of time in the same equipment or otherwise smaller reaction vessels are required for producing the same quantity of interesterified oil per unit of time.

The prior art

In U.S. patent specification 2,442,531–5 the use of solvents like pentane, hexane, ethylether, benzene, skellysolve carbon-tetrachloride and pyridine has been described. These solvents were used for lowering the reaction temperature and for facilitating the separation of solid and liquid fractions.

Similarly, in Australian patent application 24,398/67 the use of petroleum solvent and paraffinic dry cleaning spirit in an interesterification process is described.

For the selective extraction of saturated or unsaturated triglyceride fractions present in interesterified glycerides other solvents like nitromethane, acetonitrile, etc. are described in British patent specification 682,792, liquid propane, propene, ethane, etc. in U.S. patent specification 2,688,626 and organic compounds like dimethylformamide, dimethyl cyanamide, etc. in U.S. patent specification 3,376,326.

SUMMARY OF THE INVENTION

The present invention provides a method for accelerating random and directed interesterification reactions by carrying out the reaction in the presence of a reaction rate accelerating amount of an aliphatic ketone. Preferably the interesterification reaction is carried out in the presence of an aliphatic monoketone.

The reaction rates of the prior art processes, especially of directed interesterification reactions, are, for practical purposes, frequently too low. In the directed interesterification of palm oil, e.g. at a temperature of 35° C., using 0.15 percent of sodium as catalyst, with the object to obtain an oil containing at least 25% saturated triglycerides, reaction rate constants of at most 0.5 have been calculated, whereas by applying the process of the present invention reaction rate constants of up to 1.5 are obtainable. Similarly for random interesterification or coconut oil reaction rate constants of prior art processes at about 30° C. are about 1.1, whereas by applying the process of the present invention these reaction rate constants can be increased to values of 30 to 85 and even more. For the purpose of this invention by the "reaction rate constant" $k$ is to be understood the factor $k$, which can for various oils and fats be derived from the following equation:

$$-\ln\left(\frac{Dt-Do}{D\infty-Do}\right) = k\left(\frac{t-t'}{60}\right)$$

in which $Dt$ = measured dilatation, e.g. at 25° C. for coconut oil, after reaction time $t$ (mm.$^3$/25 g.)
$Do$ = dilatation at the same temperature of the starting triglyceride (mm.$^3$/25 g.)
$D\infty$ = measured dilatation at the same temperature after complete interesterification (mm.$^3$/25 g.)
$k$ = reaction rate constant (hours$^{-1}$)
$t$ = reaction time (minutes)
$t'$ = induction period (minutes)

The induction period $t'$ can be derived from the graph obtained by plotting dilatation values measured at a certain temperature against the reaction time. The induction period is that period over which $Do=Dt$. The dilatation values are measured at a temperature near the melting point of the glyceride mixture, because then the most significant change in dilatation value can be observed. A suitable temperature for measuring the dilatation values of coconut oil is e.g. 25° C., of palm oil e.g. 40° C.

The above-described equation is based on the approximation that both the random and the directed interesterifications behave as first-order reactions and that the degree of conversion of uninteresterified to interesterified glycerides can be represented by the increase in dilatation values as a result of the interesterification. The dilatation values were measured as described in H. A. Boekenoogen, "Analysis and Characterization of Oils, Fats and Fat Products," volume I, 1964, Interscience Publishers, London, pp. 143 et seq. Alternatively the progress of our interesterification reaction can be followed by means of S.F.I. values of samples taken from selected experimental runs during the interesterification reaction, by means of pulse NMR analysis of such samples, or by means of enzymatic hydrolysis and TLC analysis of such samples.

For the purpose of this invention by "ketones" are to be understood both saturated and unsaturated aliphatic compounds containing a ketonic carbonyl group. Interesterification reaction rate accelerating compounds formed from ketones under the conditions of the reaction are understood to be included in this definition.

The ketones used in the process of the invention can contain e.g. from 3 to 20, the aliphatic monoketones being particularly preferred. Suitable aliphatic monoketones are e.g. dimethyl ketone, methylethyl ketone, diethyl ketone, dipropyl ketone, dibutyl ketone, methyl heptyl ketone, methyl nonyl ketone, pentyl vinyl ketone and methyltridecylketone.

Acetone (dimethyl ketone), which is generally accepted as an inert ingredient in the preparation of fatty foodstuffs, is particularly preferred, because it is commercially available in great quantities at economically acceptable prices, and owing to its high volatility it can completely be removed in a subsequent deodorization treatment.

From 0.2 up to as much as 50% by weight of the glyceride mixture of an aliphatic ketone, especially a monoketone, can be used. Excellent results have been obtained by the addition of 0.5% to 15% of monoketones based on the weight of the glyceride mixture.

The interesterification reactions can be carried out at temperatures ranging from −30° C. to 150° C., depending on the type of interesterification reaction applied and the type of glyceride mixture and ketone used. The lower temperature limit is mainly determined by the melting point of the heavier glyceride fraction of the glyceride mixture under directed interesterification conditions and the upper temperature limit by process-economical considerations and/or the volatility of the ketone under random interesterification conditions. Random interesterification reactions are preferably carried out at temperatures from 25° to 100° C., particularly from 30° to 60° C. Directed interesterifications are preferably carried out at temperatures from −20° to 60° C., particularly from −10° to 45° C. In the directed interesterification of oils which are normally liquid at ambient temperature, it is of importance that the temperature at which the interesterification is carried out is sufficiently low to prevent the heavier glyceride fraction from dissolving in the liquid oil.

The low temperature catalysts which may be used in the process of the present invention are alkali metals, their alloys or their catalytically active derivatives, e.g. in an amount of from 0.01% to 0.5% by weight of the glyceride mixture. Suitable interesterification catalysts are aklali metals, e.g. sodium potassium, their hydroxides or their alcoholates (alkoxides), which catalysts are preferably used in proportions of from 0.02% to 0.3% by weight.

Although the alkali metals and/or derivatives are generally called "catalysts" or "low temperature catalysts," the nature of the active catalyst in the reaction is not yet fully understood. In this specification by "catalysts" or "low temperature catalysts" are therefore to be understood the alkali metals, their alloys or their above-mentioned derivatives as well as the catalytically active reaction products which might have been formed in situ from said "catalysts" during the interesterification treatment.

The glycerides, preferably triglycerides, to be treated according to this invention contain acid radicals including both saturated and unsaturated fatty acid radicals with 2 to 26 carbon atoms.

The triglycerides are generally called "oils" or "fats," and for the purpose of the invention by "oils" are meant both the triglycerides which are solid at ambient temperature about 15°–25° C. and are usually termed "fats" and the triglycerides which are liquid at ambient temperature which are usually termed "oils."

If the triglycerides which are treated according to the present invention are oils containing catalyst poisons (e.g. water and free fatty acids) in such proportions that a substantial proportion of the catalyst supplied is inactivated, at least the major part of such poisons should be removed before the catalyst and/or the monoketone is added, because the effect of using greater quantities of catalysts to compensate for the presence of substantial quantities of catalyst poisons may lead to an unacceptable high viscosity of the oil/soap mixture, blocking of filters with soap gel, soap formation on the inner wall of the reactor and a considerable reduction in reaction rate.

The proportions of catalyst mentioned before are based on glyceride mixtures which are free from catalyst poisons. If, even after a pre-treatment to remove such poisons, minor proportions of catalyst poisons still remain in the oil, so much more catalyst should be added to compensate for the catalyst poisons. Thus, when a crude oil mixture having e.g. an acid value of 2–5 and an amount of water exceeding 0.05% is interesterified, the weight of catalyst should be increased by at least 0.3% to complete interesterification, but then undesirable side effects may still occur. Since water and free acids are the principal catalyst poisons, it is therefore preferred to carefully neutralize the mixture to be interesterified and to reduce the water content to a level of below 0.05%, preferably below 0.015%, and in particular below 0.01% before interesterification.

Although the drying step may be effected in several ways, when a deacidification process by distillation is carried out, as is usual in the edible oils industry, supplementary drying is not as a rule necessary for the purpose of the present invention. Drying may alternatively be effected by treating the mixture at an elevated temperature with a dry inert gas.

However, drying is preferably carried out by means of an apparatus in which a reduced pressure of e.g. 10 to 50 mm. mercury and an elevated temperature of e.g. 100 to 140° C. are maintained, the heated mixture of glycerides being atomised at the top of a chamber of the apparatus in which a vacuum is maintained to effect rapid evaporation of most of the water present. The operation can be carried out, if desired, in two or more stages. It has been found that good results are obtained by means of a double-stage vacuum drying apparatus working at pressures of 45 and 10 mm. mercury respectively, for an oil inlet temperature of 125° to 140° C.

The temperature of the liquid to be atomised and the vacuum conditions are so chosen that the moisture content of the product to be interesterified is below the above-mentioned percentages.

Prior to interesterification ester mixtures are also preferably deacidified to an acid value of less than 0.3, preferably less than 0.1. By "acid value" is to be understood the number of milligrammes of potassium hydroxide required to neutralize 1 g. of the mixture to be interesterified. The acid value is determined by the process described by H. A. Boekenoogen, "Aanlysis and Characterization of Oils, Fats and Products," vol. I, 1964, Interscience Publishers, London, pp. 23–24. Since this determination is carried out at ambient temperature in a short space of time, the esters are not saponified, so that an acid value of 0 is obtained in the absence of free acids. The mixture to be interesterified can be deacidified by using a process of deacidification by distillation in vacuo, but it can also be effected by direct contact with an alkaline solution, by which soaps are formed which can be separated by the difference in specific gravity between the oil and the soap. Such alkali deacidification can be carried out by means of an 0.2 to 8 N sodium hydroxide solution.

Deacidification can be carried out continuously in centrifugal apparatus which ensure a brief period of contact between the oil and the alkali solution. Moreover, continuous deacidification can also be carried out by mixing the product rapidly with the alkaline solution, then washing the mixture in a packed column. However, deacidification is preferably carried out by passing the oil to be deacidified concurrently or countercurrently through a packed column filled with the alkaline solution, if necessary at a raised pressure and at a temperature of 80° to 160° C., while the oil constitutes the dispersed phase. Such deacidification processes are described in Dutch patent applications 6503471 and 6603470.

The process according to the invention will now be illustrated by the following examples:

EXAMPLE I.—RANDOM INTERESTERIFICATION

Refined coconut oil of an acid number below 0.1 was dried for 40 minutes at 125° C. and 2 mm. Hg to a moisture content below 0.01%. An amount of this dried oil was transferred to a reactor provided with a stirrer, thermometer and cooling jacket, in which the oil was cooled to 30° C.

Random interesterifications were performed by adding to the oil 0.15% by weight of sodium (a 33% dispersion in paraffin oil) and in the presence of organic substances like acetone (Example I), 1-butanol (control), di-isopropyl ether (control), dimethyl formamide (control), morpholine (control) and pyridine (control).

The organic substances were added to the oil (in a proportion of 1% by weight of the oil) 7 minutes after the addition of the catalyst.

At regular intervals samples were taken and the dilatation value at 25° C. (D 25) was measured.

The reaction rate constants were calculated from the dilatation increase according to the equation described before.

For coconut oil $D_o = 60$ and $D_\infty 350$.

The results of the experiments are tabulated in Table I and show that the reaction rate increasing effect of acetone is most significant.

TABLE I

| Additive | D 25 after $t$ minutes reaction time | | Reaction rate constant (h.$^{-1}$) |
|---|---|---|---|
| | $t$ | D 25 | |
| Acetone (Example I) | 5<br>10<br>15<br>20 | 65<br>125<br>335<br>350 | 30 |
| 1-butanol (control) | 5<br>10<br>15<br>20<br>70 | 85<br>145<br>165<br>170<br>175 | 4.4 |
| Di-isopropyl ether (control) | 20<br>30<br>40<br>60<br>80 | 70<br>160<br>265<br>310<br>325 | 4.2 |
| Dimethyl formamide (control) | 20<br>40<br>80<br>120<br>180 | 60<br>150<br>285<br>325<br>350 | 1.5 |
| Morpholine (control) | 20<br>40<br>80<br>120<br>180 | 60<br>155<br>270<br>270<br>270 | 1.5 |
| Pyridine (control) | 40<br>80<br>120<br>160<br>200 | 80<br>175<br>265<br>330<br>350 | 1.2 |
| Without additive (control) | 40<br>80<br>120<br>160<br>240 | 60<br>140<br>235<br>335<br>350 | 1.1 |

EXAMPLES II–IV.—RANDOM INTERESTERIFICATION

Example I was repeated under identical conditions, except that now as additive respectively methylethyl ketone (Example II), diethyl ketone (Example III) and dibutyl ketone (Example IV) were used.

From the dilatation values measured after regular intervals the reaction rate constants were calculated as before.

The values are tabulated in Table II.

TABLE II

| Example No. | Additive | Reaction rate constant |
|---|---|---|
| II | Methylethyl ketone | 36 |
| III | Diethyl ketone | 36 |
| IV | Dibutyl ketone | 24 |

EXAMPLES V–VII.—RANDOM INTERESTERIFICATION

Example I was repeated under identical conditions, except that now the additives, viz. dimethyl ketone, methylethyl ketone and diethyl ketone, were added before the catalyst dispersion was added.

From the dilatation values the reaction rate constants were calculated.

The values are compiled in Table III.

TABLE III

| Example No. | Additive | Reaction rate constant |
|---|---|---|
| V | Dimethyl ketone | 32 |
| VI | Methylethyl ketone | 36 |
| VII | Diethyl ketone | 33 |

EXAMPLES VIII–XI.—RANDOM INTERESTERIFICATION

The experiment described in Example I was repeated except that the interesterification reaction was carried out at 35° C. in the presence of diethyl ketone, which was added to the oil before the catalyst was added.

The following concentrations of diethyl ketone were used:

| | Percent |
|---|---|
| Example VIII | 5 |
| Example IX | 3 |
| Example X | 1 |
| Example XI | 0.5 |

From the dilatation values measured the following reaction rate constants ($h^{-1}$) were calculated:

Example VIII _____ 83
Example IX _____ 66
Example X _____ 48
Example XI _____ 37

EXAMPLES XII–XV.—RANDOM INTERESTERIFICATION

Examples VIII–XI were repeated using the same additives in the same proportions at a reaction temperature of 30° C.

The following reaction rate constants were calculated:

Example XII (5% diethyl ketone) _____ 59
Example XIII (3% diethyl ketone) _____ 44
Example XIV (1% diethyl ketone) _____ 32
Example XV (0.5% diethyl ketone) _____ 23

EXAMPLES XVI–XIX.—RANDOM INTERESTERIFICATION

Examples VII–XI were repeated using the same additives in the same proportions at a reaction temperature of 25° C.

The following reaction rate constants were calculated:

Example XVI (5% diethyl ketone _____ 37
Example XVII (3% diethyl ketone) _____ 29
Example XVIII (1% diethyl ketone) _____ 20
Example XIX (0.5% diethyl ketone) _____ 15

EXAMPLE XX.—DIRECTED INTERESTERIFICATION

Refined palm oil with an acid number of below 0.1 was dried as described in Example I until the water content was below 0.01% by weight.

An amount of this dried oil was transferred to a reactor provided with a stirrer, thermometer and cooling jacket, in which the oil was brought to a temperature of 45° C. Subsequently 0.05% by weight of sodium in the form of a 30% dispersion in paraffin oil and 1% by weight of acetone were added to the oil. The mixture of oil and catalyst was stirred for 1 hour while the temperature was kept at 45° C. The mixture was now brought at 40° C. to effect the directed interesterification reaction and samples were taken at regular intervals. The dilatation value at 40° C. was measured until no further change in dilatation values could be observed. From the dilatation values the reaction rate constant was calculated as described before. The calculated value was 0.16, whereas the reaction rate constant of an interesterification carried out under identical conditions, with the exception that no acetone was added, was only 0.11.

EXAMPLE XXI.—DIRECTED INTERESTERIFICATION

Example XX was repeated except that the interesterification was performed at 35° C. The reaction rate constant calculated from the increase in dilatation values was 0.4 and that of an identical reaction carried out without acetone was 0.16.

EXAMPLE XXII.—DIRECTED INTERESTERIFICATION

Example XXI was repeated except that the sodium concentration was 0.15%. The reaction rate constant was 0.7 and that of the control experiment without acetone was 0.5.

EXAMPLE XXIII.—DIRECTED INTERESTERIFICATION

Example XX was repeated except that the reaction was carried out at 30° C. The reaction rate constant was 0.1.

EXAMPLES XXIV–XXVIII.—DIRECTED INTERESTERIFICATION

Several directed interesterifications were carried out as described in Example XX using various proportions of acetone and sodium at temperatures of 20° to 35° C. The results are summarized in the following Table IV.

TABLE IV

[Reaction rate constants (h.⁻¹)]

| | | Temperature, °C. | | | | |
|---|---|---|---|---|---|---|
| | | 35 | 30 | 25 | | 20 |
| | | Sodium conc., percent | | | | |
| | | 0.05 | 0.15 | 0.05 | 0.15 | 0.15 | 0.15 |
| | | Example | | | | |
| Example | Acetone conc., percent | A | B | C | D | E | F |
| Control | 0 | 0.16 | 0.5 | | 0.24 | | |
| XXIV | 0.5 | 0.25 | | | | | |
| XXV | 3 | 0.22 | 0.75 | 0.17 | 0.8 | | |
| XXVI | 5 | | 0.62 | 0.21 | 1.3 | | |
| XXVII | 10 | | | | 1.1 | 1.3 | |
| XXVIII | 15 | | | | | 1.2 | 0.9 |

EXAMPLES XXIX–XXX.—RANDOM INTERESTERIFICATION

Example I was repeated except that 0.05% of sodium was used and that the acetone concentration was 20% (Example XXIX and 50% (Example XXX) calculated on the amount of fat respectively.

The reaction rate constants were:

Example XXIX _____ 22
Example XXX _____ 19.5

When this experiment was repeated with 100% of aceton calculated on the fat, no change in dilatation values could be observed at all.

EXAMPLE XXXI–XXXII.—RANDOM INTERESTERIFICATION

Example III was repeated except that 0.05% of sodium was used and that the reaction was carried out at 60° C. (Example XXXI) and 90° C. (Example XXXII) respectively.

The reaction rate constants were:

Example XXXI _____ 48
Example XXXII _____ 126

EXAMPLE XXXIII–XXXVII.—RANDOM INTERESTERIFICATION

Example I was repeated except that different ketones were used.

The ketones and reaction rate constants obtained are listed below:

| Example | Ketone | Reaction rate constant |
|---|---|---|
| XXXIII | Di-isobutyl ketone | 8.9 |
| XXXIV | Methyl heptyl ketone | 9.6 |
| XXXV | Methyl nonyl ketone | 21 |
| XXXVI | Pentyl vinyl ketone | 6.8 |
| XXXVII | Methyl tridecyl ketone | 3.1 |

EXAMPLES XXXVIII–XL

Refined sunflower oil of an acid number of 0.1 was dried to a moisture content of below 0.01% as described in Example I.

Three batches of this oil were randomly interesterified as described in Example I in the presence of 1% acetone (Example XXXVIII), 2% acetone (Example IXL) or 3% acetone (Example XL), respectively.

The progress of the interesterification reaction was followed by enzymatic hydrolysis and TLC analysis of samples taken at regular intervals. From the fatty acid composition at the 2-position of the triglyceride molecule it can be concluded whether or not the interesterification reaction is completed. This analysis technique is described in Boekenoogen's "Analysis and Characterisation of Oils, Fats and Fat Products," vol. 2, 1968, Interscience Publishers, London, pp. 266 et seq.

In Example XXXVIII the reaction was completed after 8 minutes, in Example IXL after 4 minutes and in Example XL after 3 minutes.

In a control experiment, carried out under identical conditions, except that no acetone was added, the reaction was completed in 150 minutes.

Although in the previous Examples I–XL directed and random interesterifications of palm oil, coconut oil and sunflower oil have been described, similar results are obtained if other vegetable and/or animal oils and fats are used, e.g. tallow, lard, groundnut oil, safflower oil, olive oil, rapeseed oil, etc. Other low temperature interesterification catalysts than sodium can be used without adversely affecting the reaction rate accelerating effect of the solvents, e.g. potassium or a potassium/sodium alloy as well as alkali metal hydroxides and alkoxides like sodium ethylate or methylate.

What is claimed is:

1. Process for effecting interesterification of a mixture of triglycerides of an acid value of less than 0.3, said glycerides containing fatty acid radicals with 2 to 26 carbon atoms, in which the reaction is carried out at temperatures from —30 to 150° C. in the presence of 0.01 to 0.5% by weight of alkali metals or their catalycally active derivatives, no more than 0.05% by weight of water, and 0.02 to 50% by weight of an aliphatic ketone containing 3 to 20 carbon atoms.

2. Process according to claim 1, in which the ketone is a monoketone.

3. Process according to claim 1, in which the ketone is acetone.

4. Process according to claim 1, in which 0.5 to 15% by weight of the glyceride mixture of ketone is used.

5. Process for effecting random interesterification according to claim 1, in which the reaction is carried out at temperatures from 25 to 100° C.

6. Process according to claim 5, in which the reaction is carried out at temperatures from 30 to 60° C.

7. Process for effecting directed interesterification according to claim 1, in which the reaction is carried out at temperatures from −20 to 60° C.

8. Process according to claim 7, in which the reaction is carried out at temperatures from −10 to 45° C.

9. Process according to claim 1 in which the reaction is carried out in the presence of sodium.

References Cited

UNITED STATES PATENTS

| 3,328,439 | 6/1967 | Hamilton | 260—410.9 |
| 2,442,534 | 6/1948 | Eckey | 260—410.7 |
| 2,726,158 | 12/1955 | Cochran et al. | 99—118 |
| 2,740,799 | 4/1956 | Young et al. | 260—410.7 |
| 2,928,745 | 3/1960 | Roylance | 99—118 |

FOREIGN PATENTS 840,779  7/1960  Great Britain.

D. RIVERS, Assistant Examiner

LEWIS GOTTS, Primary Examiner

U.S. Cl. X.R.

260—410.8, 491